O. R. WIKANDER.
FLEXIBLE BUSHING.
APPLICATION FILED MAY 10, 1918.

1,384,173.

Patented July 12, 1921.

INVENTOR
Oscar Ragnar Wikander
By
ATTORNEY

UNITED STATES PATENT OFFICE.

OSCAR RAGNAR WIKANDER, OF PITTSBURGH, PENNSYLVANIA, ASSIGNOR, BY DIRECT AND MESNE ASSIGNMENTS, TO S K F BALL BEARING COMPANY, OF HARTFORD, CONNECTICUT, A CORPORATION OF CONNECTICUT.

FLEXIBLE BUSHING.

1,384,173.  Specification of Letters Patent.  Patented July 12, 1921.

Application filed May 10, 1918. Serial No. 233,695.

*To all whom it may concern:*

Be it known that I, OSCAR RAGNAR WIKANDER, citizen of the United States, and resident of Pittsburgh, county of Allegheny, and State of Pennsylvania, have invented an Improvement in Flexible Bushings, of which the following is a specification.

The invention refers to bushings which transmit lateral forces from an inner core to an outer sleeve or cylinder or vice versa, and its object is to equalize the forces transmitted by several bushings and to prevent shocks or pulsations of power from being transmitted through said bushings.

This new type of bushing is intended to take the place of rubber bushings for flexible couplings and similar applications in power transmitting devices.

Figure 1:
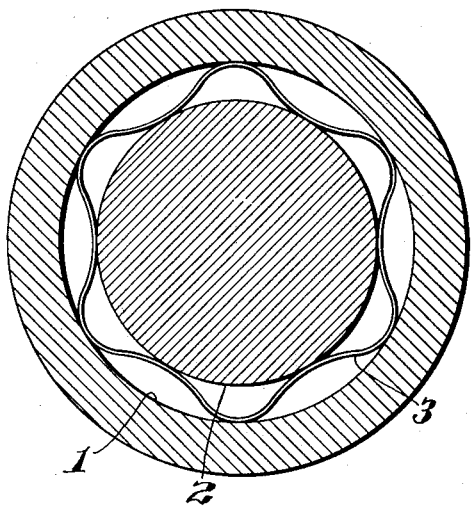
Figure 2:
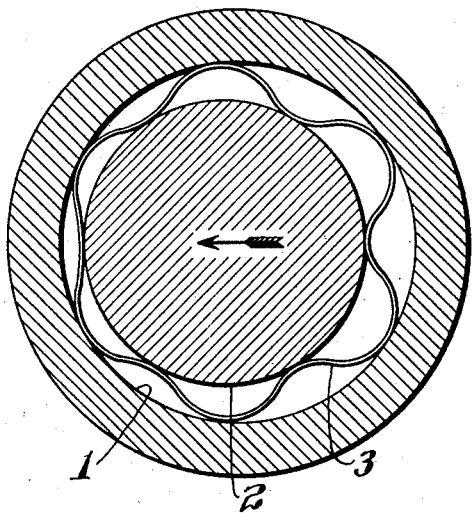
Figure 3:
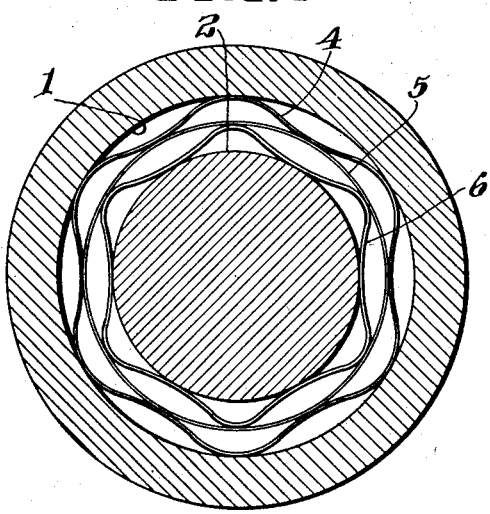

Referring to the drawings: Figure 1 shows a sectional view illustrating the use of a single corrugated annular spring between the two parts of one element of a journal and bearing and in which all of the yielding points in the circumference are staggered and Fig. 2 shows the same when the device is subjected to a lateral force. Fig. 3 shows a section of my improved invention embodying a plurality of concentrically arranged corrugated annular spring parts and an interposed spring tube to constitute a compound bushing element having a plurality of yielding points in each of a number of radial lines about the circumference, and Fig. 4 is a similar section when the bushing is subjected to a lateral force.

Referring to Figs. 1 and 2, 1 is the inner surface of the sleeve or cylinder surrounding the flexible bushing. 2 is the inside core of said bushing. 3 is a corrugated sheet spring tube, the crests of the corrugations bearing against the surfaces 1 and 2. Fig. 2 shows the deflection of the bushing produced by a lateral force acting in the direction of the arrow shown in the drawing. In this construction, the core 2 and the sleeve or cylinder 1 may be relatively movable in all directions; ordinarily, the sleeve would not rotate relatively to the core but would act as a bearing about which a rotating part would be journaled and upon which it would revolve. The objection to a construction in which only a single corrugated flexible tube is employed between the parts 1 and 2, resides in that all of the flexibility must come on the staggered points of contact with either the core 2 or the sleeve 1, and where considerable flexibility is required, the corrugated spring sleeve is liable to crack.

Figure 4:
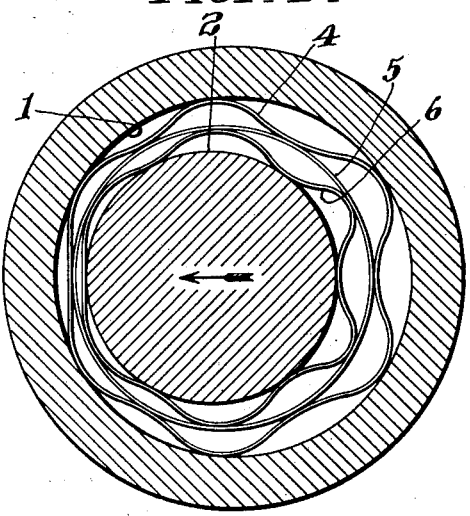
Figure 5:
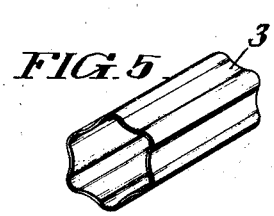

The design shown in Figs. 1 and 2 does not permit of a very large deflection without danger of breakage and to avoid such danger it is preferable to use my improved construction shown in Figs. 3 and 4 when a considerable deflection is wanted.

The flexible bushing, of which Fig. 3 shows a vertical section across the axis, consists of an outside corrugated sheet spring tube 4, an intermediate cylindrical sheet spring tube 5, and an inside corrugated sheet spring tube 6, the corrugations of the tubes 4 and 6 being as nearly parallel as possible.

Fig. 4 shows the deflection of said bushing produced by a force acting in the direction of the arrow shown in the drawing.

From the action indicated in Fig. 4, it will be seen that not only do the corrugated annular spring parts 4 and 6 provide yieldingness in the same radial lines, but the interposed cylindrical spring tubular part 5 also provides yieldingness between its points of contact with the corrugated annular parts 4 and 6, thereby providing three times the flexibility of the structure of Figs. 1 and 2, and this advantage may be still greater increased by the addition of another corrugated annular part and another cylindrical part of similar character to those shown.

It is evident that any desired deflection can be obtained without exceeding the permissible stresses in the material if a sufficient number of alternatingly cylindrical and corrugated tubes, such as shown in Figs. 3 and 4, are used.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Patent claims—

1. A flexible bushing comprising a plurality of alternately arranged corrugated continuous annular sheet springs and a cylindrical continuous annular sheet spring in direct contact with and separating the corrugated springs, all concentrically arranged and with the crests of the outermost corrugated annular sheet forming the outside contacting diameter and those of the innermost corrugated annular sheet forming the inside contacting diameter of said bushing.

2. A flexible bushing comprising two concentrically arranged flexible continuous sheet tubular parts each corrugated in the direction of its length, the corrugations of the two parts being substantially parallel so that the crests of the corrugations are in substantially radial planes, and an interposed continuous tube of thin flexible sheet metal whose inner and outer surfaces are respectively in contact at intervals circumferentially with the inner and outer corrugated tubular parts said places of contact of the two corrugated tubular parts being alternate of each other.

In testimony of which invention, I hereunto set my hand.

OSCAR RAGNAR WIKANDER.